(12) United States Patent  
Mayo et al.

(10) Patent No.: US 8,999,444 B2  
(45) Date of Patent: *Apr. 7, 2015

(54) OVERCOAT COMPOSITION FOR INK JET PRINTING

(71) Applicant: Xerox Corporation, Norwalk, CT (US)

(72) Inventors: James D. Mayo, Mississauga (CA); Stephan Drappel, Toronto (CA); C. Geoffrey Allen, Waterdown (CA); Biby E. Abraham, Mississauga (CA); Sonja Hadzidedic, Oakville (CA)

(73) Assignee: Xerox Corporation, Norwalk, CT (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/905,309

(22) Filed: May 30, 2013

(65) Prior Publication Data  
US 2014/0354742 A1 Dec. 4, 2014

(51) Int. Cl.  
B41M 5/50 (2006.01)  
B41M 1/36 (2006.01)  
B41J 11/00 (2006.01)

(52) U.S. Cl.  
CPC .................. B41J 11/0015 (2013.01)

(58) Field of Classification Search  
None  
See application file for complete search history.

(56) References Cited

U.S. PATENT DOCUMENTS

| 4,303,924 A | 12/1981 | Young, Jr. |
| 4,978,969 A | 12/1990 | Chieng |
| 5,270,368 A | 12/1993 | Lent et al. |
| 5,623,001 A | 4/1997 | Figov |
| 5,844,020 A | 12/1998 | Paine et al. |
| 5,952,402 A | 9/1999 | Paine et al. |
| 6,042,227 A | 3/2000 | Meinhardt et al. |
| 6,825,315 B2 | 11/2004 | Aubert |

OTHER PUBLICATIONS

Luo, X. et al., "A Thremally Responsive, Rigid, and Reversible Adhesive," *Polymer*, 51, 1169-75 (2010).  
Aubert, J.H., "Thermally Removable Epoxy Adhesives Incorporating Thermally Reversible Diels-Alder Adducts," *J. Adhesion*, 79, 609-616 (2003).  
Wouters, M. et al., "Tuneable Adhesion Through Novel Binder Technologies," *Prog. Org. Coatings*, 72, 152-158 (2011).  
U.S. Appl. No. 13/905,833, filed May 30, 2013.  
U.S. Appl. No. 13/905,314, filed May 30, 2013.  
U.S. Appl. No. 13/905,658, filed May 30, 2013.  
U.S. Appl. No. 13/905,729, filed May 30, 2013.

Primary Examiner — Michael Cleveland  
Assistant Examiner — Lisha Jiang  
(74) Attorney, Agent, or Firm — Pillsbury Winthrop Shaw Pittman LLP

(57) ABSTRACT

An ink jettable overprint composition includes a reversible polymer material, which can reversibly transition between a liquid state and a solid state by reversible cycloaddition reactions, wherein upon cooling, the reversible polymer material transitions from a liquid state to a solid state by reversible cycloaddition reactions within a time period of less than about 10 seconds.

19 Claims, 3 Drawing Sheets

OVERCOAT COMPOSITION FOR INK JET PRINTING

TECHNICAL FIELD

The present disclosure is generally directed to an overcoat composition for use in ink jet printing, such as solid ink jet printing, the overcoat composition comprising a reversible polymer material that adds robustness, such as improved scratch and rub resistance, to the printed ink jet image, and a method of ink jet printing using the overcoat composition.

BACKGROUND

Wax based inks, sometimes known as phase change inks or solid inks, are used to form digital images on paper using heated piezoelectric or acoustic inkjet heads. The ejection of an ink drop by the print heads is electronically controlled. In embodiments, the hot drop partially cools upon hitting an intermediate surface, often an aluminum drum. The complete image is assembled on the intermediate surface and then transferred to paper and fixed thereon with a combination of pressure and heat resulting in a solid ink, or waxed-based ink print. Alternatively, the ink can be ejected directly onto the final print substrate such as paper to form the printed image.

Known methods of protecting ink jet printed images include applying an overprint coating to the printed image and substrate. The overprint coating, often referred to as an overprint varnish or composition, is typically a liquid film coating that may be dried and/or cured. Curing may be accomplished through drying or heating or by applying ultraviolet light or low voltage electron beams to polymerize (crosslink) the components of the overcoat. However, known overprint coatings fail to adequately protect the printed images and do not possess the requisite properties for controlled application, such as, for example, by an ink jet printer.

Other types of coating formulations for ink-based images are also known. For example, UV curable ink-jet inks have been used in an attempt to overcome the failure of ink jet-generated images to withstand heat and sunlight. Typically, such UV curable ink-jet inks include polymerizable monomers, oligomers, or a mixture thereof along with a dye or pigment for color. However, these ink-jet inks often contain relatively large amounts of toxic solvent or water, as described in U.S. Pat. Nos. 4,978,969 and 5,623,001, respectively, or other toxic components, such as the varnish described in U.S. Pat. No. 5,270,368, or require specific, impractical conditions, such as, the varnish described in U.S. Pat. No. 4,303,924.

Typically, known coating formulations are applied using a liquid film coating device, and thus are often applied over the entire surface of the substrate and the image, i.e., flood coating. Applying a composition to part of an image, i.e., spot coating, is possible, but it requires preparing a plate or cylinder prior to application of the overprint composition. Thus, applying known coating formulations can be inefficient, difficult, and time-consuming and is not desirable for integration with variable-data digital printing.

Solid Inks have thus suffered from a lack of robustness, manifested as poor resistance to scratch, rub, fold, and other outside influences on the final print. Overcoatings have long been proposed as a solution to this problem, but if applied to the entire page, they add significant cost to the per page cost of printing. Digital overcoats have been attempted, but because the viscosity requirements of jetting are imposed on these materials, they are often not significantly more durable than the ink layer itself, thus they merely act as a sacrificial layer, which does not truly improve image robustness. Curable overcoats will solve the robustness problem, but add cost and complexity to the printer, as a curing station must be incorporated.

Accordingly, there is a need for a durable, hard material having very low melt viscosity that can be jetted at typical ink jet operating temperatures. There is also a need for an ink jettable protective composition that provides overprint coating properties including, but not limited to, thermal and light stability, scratch resistance, and smear (or rub) resistance, particularly in commercial print applications. More specifically, a need exists for an overprint coating that has a low viscosity (to enable ink jetting), yet is stable at the generally high temperature required for ink jetting and achieves the desired properties, including, but not limited to, the ability to wet over the inked image on the print substrate, and protect an image from sun, heat, etc.

SUMMARY

The present disclosure in embodiments addresses the above and other needs by providing an overcoat composition for use in ink jet printing, the overcoat composition comprising a reversible polymer material that adds robustness to the printed ink jet image.

More particularly, the present disclosure provides an ink jettable overprint composition, comprising a reversible polymer material, which can reversibly transition between a liquid state and a solid state by reversible cycloaddition reactions, wherein upon cooling, the reversible polymer material transitions from a liquid state to a solid state by reversible cycloaddition reactions within a time period of less than about 10 seconds.

In another embodiment, the present disclosure provides a method of ink jet printing, comprising:

providing an ink jettable overprint composition according to claim 1;

ink jetting the overprint composition onto a substrate having an image thereon; and cooling the overprint composition, whereby the reversible polymer material transitions from a liquid state to a solid state by reversible cycloaddition reactions within a time period of less than about 10 seconds.

DETAILED DESCRIPTION

Figure 1A:
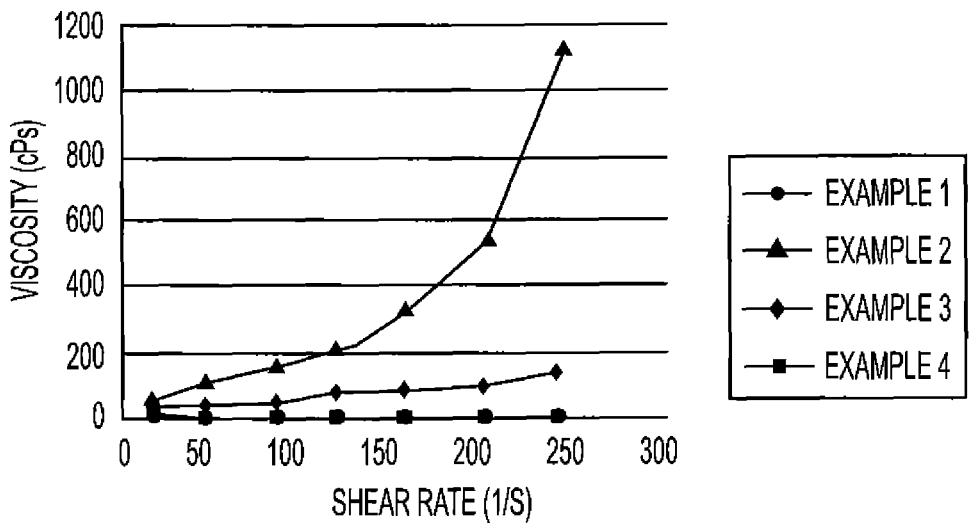
FIG. 1A and FIG. 1B show viscosity properties of coatings according to the Examples.

The present disclosure provides ink jettable, image protecting compositions comprising a reversible polymer material especially adapted for ink jet printers, and particularly adapted for digitally overcoating a printed ink jet image. The compositions comprise a reversible polymer material formed from constituent materials based on Diels Alder chemistry, which can quickly reversibly transition between a liquid state and a solid state by reversible cycloaddition reactions.

In the heated liquid state, the composition is preferably a low viscous liquid and is readily jettable. Upon cooling, the composition quickly undergoes reversible cycloaddition reactions that convert the liquid composition into a cured protective overcoat. This protective overcoat provides printed images with, for example, durability, thermal and light stability, and scratch and smear resistance. Thus, the composition is particularly well-suited for coating ink-based images on substrates subjected to heat and sunlight because the composition protects the image from cracking and fading, provides image permanence, and allows for overwriting in the absence of smearing and beading.

Overcoat Composition

The overcoat composition includes as an essential component a reversible polymer material, which can reversibly transition between a liquid state and a solid state by reversible cycloaddition reactions. In embodiments, the reversible polymer is formed from constituent materials based on Diels Alder chemistry. These materials are "curable" in that they can be deposited on a substrate in a liquid state, making them suitable for such deposition methods as spraying, ink jet printing, and the like. The materials have end groups suitable for Diels Alder cycloadditions and co-exist in the molten or liquid state as a very low viscosity liquid. However, as the materials are cooled, cycloaddition takes place, resulting in hard polymers with excellent film forming and adhesion characteristics. The reversible polymer material is thus particularly useful in ink jet printing applications because it can be easily jetted while in the molten state, but form a hard polymer when solidified. The reversible nature of the reaction also allows the composition to be repeatedly heated and cooled in the printing apparatus to match printing demand.

Reverse Diels-Alder based polymers are generally known, and have been investigated for use in solid ink printing, as exemplified for example by U.S. Pat. Nos. 5,844,020, 5,952,402, and 6,042,227. However, the Diels-Alder based polymers previously investigated suffered from long solidification times after being deposited on a substrate. For example, it was found that many of the prior Diels-Alder based polymers had solidification times on the order of several hours, making them unsuitable for use in most printing applications. Long solidification times are unsuitable because while the printed material remains in a liquid or semi-liquid state, the image can become distorted, image quality can degrade, and the printed images cannot be stacked on top of each other resulting in either large space needs or low throughput.

In contrast, the reversible polymer materials of the present disclosure have solidification times on the order of seconds, making them more suitable for use in printing and imaging applications. Due to the faster solidification times, the printed images retain their high quality image, printed sheets can be stacked on top of each other, and faster throughput can be achieved. Thus, in embodiments, the solidification time of the reversible polymer material is less than about 10 seconds, such as less than about 5 seconds or less than about 3 seconds. For example, the solidification time for the reversible polymer material can be from about 0.01 second or from about 0.05 second or from about 0.1 second to about 0.5 second or about 1 second or about 5 seconds. By "solidification" herein it is meant that the sample is hardened and emits an audible clicking sound when tapped with a spatula. For example, when samples are prepared as films not exceeding 5 mm in thickness, the rate of cooling is very fast and does not play a role in the solidification times of each of the samples. In these samples, the solidification time is taken to be the time after the rapid cooling to ambient or room temperature. The degree of polymerization can also be measured using $^1$H NMR spectroscopy, although it has been found that the degree of polymerization does not necessarily correlate with solidification times.

To achieve these faster solidification times, embodiments of the present disclosure utilize reversible polymer materials that are formed from maleimides and furans, with varying linking chemistry. The maleimides and furans can be in any form, such as bismaleimides and bisfurans, trigonal maleimides and trigonal furans, and the like. The linking groups can vary in length and chemistry and can include, for example, linear or branched alkyl groups, cyclic alkyl groups, aryl groups, arylalkyl groups, alkylaryl groups, alkylenedioxy groups, and the like, all of which can be substituted or unsubstituted. Although not limited, it is believed that as the size of linking group increases, the solidification time increases. For example, as the number of carbon atoms in the linking group increases, or as the number of oxygen atoms (such as in alkyleneoxy groups) in the linking group increases, the solidification time also tends to increase. Of course, it still may be possible to use compounds with otherwise slower solidification times, for example, if they are used in combination with other materials having a faster solidification time.

For example, suitable bismaleimides and bisfurans are represented by the following structures:

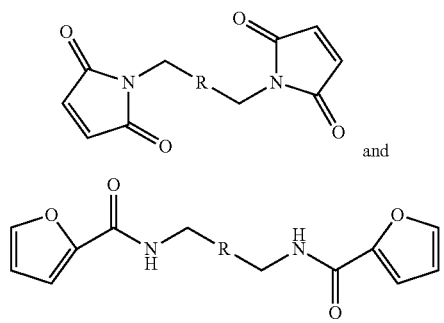

and where R is the linking group. For example, R can be an alkyl group, such as a linear alkyl group having from 1 or from about 2 to about 20 carbon atoms, from about 3 to about 15 carbon atoms, or from about 4 or about 5 or about 6 carbon atoms to about 8 or about 10 or about 12 carbon atoms; a cyclic alkyl group such as a cyclic alkyl group having about 5 or about 6 carbon atoms to about 8 or about 10 carbon atoms; an aryl group such as a phenyl group or a naphthyl group; an alkylenedioxy group having from 1 or from about 2 to about 20 carbon atoms, or from about 2 to about 10 carbon atoms, or from about 3 to about 8 carbon atoms, such as an ethylenedioxy group; or the like.

In other embodiments, trigonal structures can be used. For example, suitable trigonal maleimides and furans are represented by the following structures:

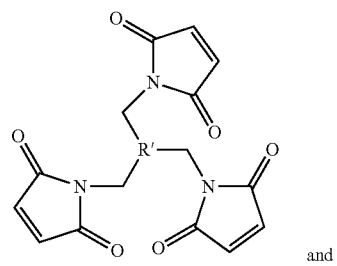

and

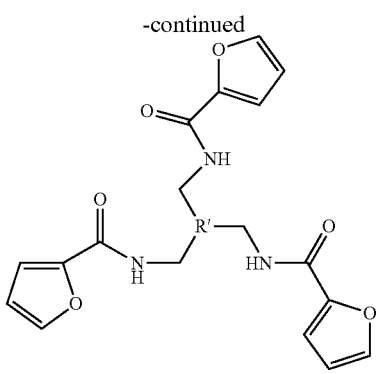

where R' is NR₃, where each R is the same or different and is the linking group as defined above. Specific embodiments of the trigonal maleimides and furans where R' is $N(CH_2)_3$— are represented by the following structures:

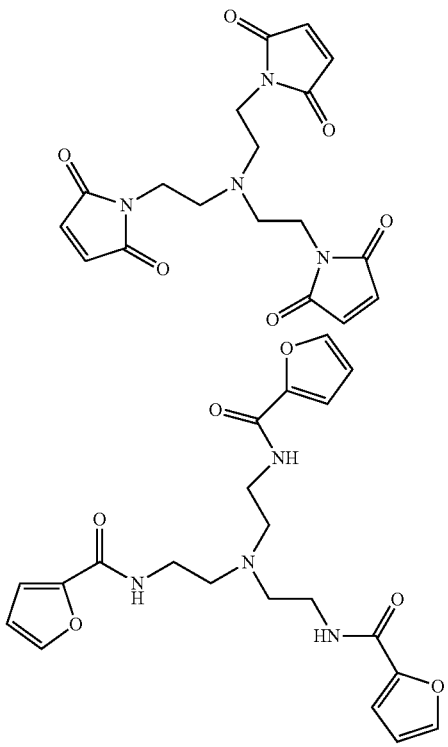

In still other embodiments, other forms of maleimides and furans can be used, and it will be understood that the present disclosure is not limited to bis- or tris-structures.

The maleimides and furans can be made by reactions known in the art, modified as will be apparent to incorporate desired linking groups. For example, the bismaleimides can be readily prepared by reacting maleic anhydride with a suitable reactant such as a diamino compound. In a similar manner, the bisfurans can be readily prepared by reacting 2-furoyl chloride with a suitable reactant such as a diamino compound. In one embodiment, where the diamino compound is a diaminoalkane, such as diaminooctane, the bismaleimide and bisfuran can be prepared as follows:

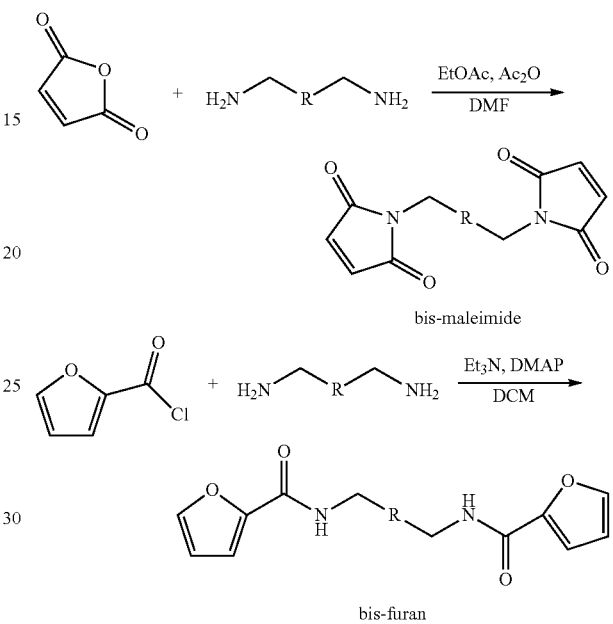

where R is the linking group as described above. Similar reaction schemes can be used to prepare the trigonal maleimides and furans.

So that the Diels-Alder cycloaddition reactions can proceed, the reversible polymer material in embodiments includes a mixture of maleimide monomer units or species and furan monomer units or species. Heating the solid maleimide/furan mixture above its melting point results in very low viscosity liquids. However, cooling of the mixtures promotes Diels-Alder coupling, resulting in the formation of polymers. Heating the polymers above the melting point of the constituent maleimide and furan species reverses the process, re-generating the low viscosity liquid. This reversible transition of the materials from monomer units or species to polymer is exemplified for one set of materials by the following reaction scheme:

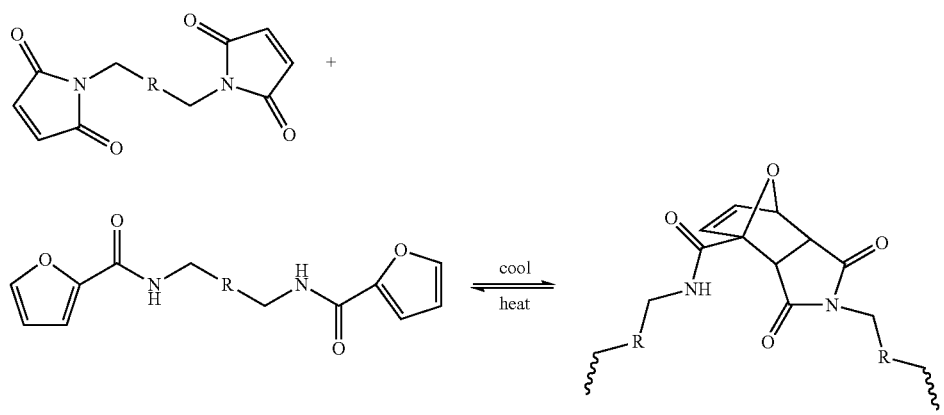

In forming the mixture of maleimide monomer units or species and furan monomer units or species, it is desired in embodiments that the materials be in approximately equimolar amounts of functional groups. Thus, for example, where the mixture is formed from bismaleimides having two reactive functional groups and bisfurans having two reactive functional groups, the bismaleimides and bisfurans are desirably present in a molar ratio of about 1:1, such as from about 1.5:1 to about 1:1.5, or from about 1.3:1 to about 1:1.3, from about 1.2:1 to about 1:1.2, or from about 1.1:1 to about 1:1.1. Similarly, where the mixture is formed from trigonal maleimides having three reactive functional groups and trigonal furans having three reactive functional groups, the trigonal maleimides and trigonal furans are desirably present in a molar ratio of about 1:1, such as from about 1.5:1 to about 1:1.5, or from about 1.3:1 to about 1:1.3, from about 1.2:1 to about 1:1.2, or from about 1.1:1 to about 1:1.1. However, where the mixture is formed from bismaleimides having two reactive functional groups and trigonal furans having three reactive functional groups, or from trigonal maleimides having three reactive functional groups and bisfurans having two reactive functional groups, the maleimides and furans are desirably present in a molar ratio of the trigonal material to the bis material of about 2:3, such as from about 2.5:3 to about 2:2.5, or from about 2.3:3 to about 2:2.7, from about 2.2:3 to about 2:2.8, or from about 2.1:3 to about 2:2.9. Although other ratios of the materials can be used, the reversible polymer material will have too much residual liquid material if the ratio of materials diverges too far from being equimolar. That is, as the ratio becomes unbalanced, there will be too much of one constituent material to react with the other material to form the reversible polymer in the solid state. The excess unreacted material will therefore only serve to dilute the coupled reversible polymer and compromise its mechanical integrity.

Although not required, it is also desired in embodiments that the materials used to form the mixture have the same linking group, or at least the same general type of linking group. Where the mixture is formed from the depicted maleimides and furans shown above, it is desirable that the maleimides and furans have the same linking group R, or at least the same type of linking group R. Thus, for example, the linking group of the maleimides and furans in embodiments is each an alkyl group, such as each a linear alkyl group of the same chain length; is each a cyclic alkyl group such as each a cyclic alkyl group having the same structure and number of carbon atoms; is each an aryl group, such as each a phenyl group; is each an alkylenedioxy group such as each an ethylenedioxy group; or the like. Mixtures of different spacer groups can be accommodated, provided the chemistries in each of the spacer groups are compatible with one another, such that the two compounds are miscible in each other. For example, mixtures having very dissimilar polarities would be inappropriate, as the two reagents would be unstable and would undergo phase separation. Of course, if desired, different linking groups can be used in the materials.

Similarly, in embodiments it is desired that the materials used to form the mixture be one form of maleimide and one form of furan. This allows the Diels-Alder reaction to more rapidly progress because the counter functional groups of the materials are more closely positioned to each other in the mixture. However, if desired, more than one type of maleimide and/or more than one type of furan can be used in forming the mixture. Thus, for example, the mixture can be formed from one type of maleimide and one type of furan, or can be formed from one, two, three, or more different maleimides and one, two, three, or more different furans, to provide desirable properties of both the liquid mixture and the solid reversible polymer.

In forming the mixture, the mixture contains at least the reversible polymer material, such as the mixture of the maleimide monomer units or species and furan monomer units or species. Because the ability of the monomers to react together by Diels-Alder cycloaddition reactions is dependent upon the materials readily contacting each other, it is desired that as few additional ingredients as possible be included in the mixture. Thus, for example, in one embodiment the mixture consists entirely of only the maleimide monomer units or species and furan monomer units or species; in other embodiments, the mixture consists essentially of the maleimide monomer units or species and furan monomer units or species, plus additional materials that do not interfere with the ability of the monomers to react to form the reversible polymer material. In still other embodiments, additional components may be included for other intended purposes. Of course, it will be appreciated in each of these variants that the mixture may also include incidental impurities and the like. Where additional materials are included in the mixture in addition to the maleimides and furans, the maleimides and furans can together be present in the mixture in a majority amount, such as from about 50, about 60, about 70, or about 80 to about 90, about 95, or about 100 percent by weight, or the maleimides and furans can together be present in the mixture in a minority amount, such as from about 1, about 5, about 10, or about 20 to about 30, about 40, or about 50 percent by weight, based on a total weight of the composition including the mixture.

If desired, the composition can include other additives for their conventional purposes. For example, the composition can include one or more of light stabilizers, UV absorbers (which absorb incident UV radiation and convert it to heat energy that is ultimately dissipated), antioxidants, optical brighteners (which can improve the appearance of the image and mask yellowing), thixotropic agents, dewetting agents, slip agents, foaming agents, antifoaming agents, flow agents, waxes, oils, plasticizers, binders, electrical conductive agents, organic and/or inorganic filler particles, leveling agents (agents that create or reduce different gloss levels), opacifiers, antistatic agents, dispersants, colorants (such as pigments and dyes), biocides, preservatives, and the like. However, additives may negatively affect the speed and degree of the reversible cycloaddition reactions, and thus care must be taken when formulating a composition using optional additives.

For example, in some embodiments, it may be helpful to include a radical scavenger in the composition. It has been found that for some reversible polymer mixtures, prolonged heating of the molten liquid can lead to irreversible hardening of the mixture, due to the propensity of maleimide compounds to undergo a 2+2 cycloaddition reaction when exposed to UV light. As a result of the cycloaddition reaction, an irreversible polymerization or hardening of the material can occur, which can render the composition unacceptable for some uses such as in a solid inkjet printer. Adding a radical scavenger to those compositions can thus prevent or significantly slow down the cycloaddition reaction, thereby preventing the irreversible polymerization from occurring, and allowing the molten liquids to maintain their low melt viscosities for a longer period of time.

Where the radical scavenger is to be included, any suitable radical scavenger can be used. Suitable radical scavengers include, for example, sorbitol, methylether hydroquinone, t-butylhydroquinone, hydroquinone, 2,5-di-1-butylhydroquinone, 2,6-di-tert-butyl-4-methyl phenol (or BHT for butylhydroxytoluene), 2,6-di-t-butyl-4-methoxyphenol, nitroxides, 2-tert-butyl-4-hydroxyanisole, 3-tert-butyl-4-hydroxyanisole, propyl ester 3,4,5-trihydroxy-benzoic acid, 2-(1,1-dimethylethyl)-1,4-benzenediol, diphenylpicrylhydrazyl, 4-tert-butylcatechol, N-methylaniline, p-methoxydiphenylamine, diphenylamine, N,N'-diphenyl-p-phenylenediamine, p-hydroxydiphenylamine, phenol, octadecyl-3-(3, 5-di-tert-butyl-4-hydroxyphenyl)propionate, tetrakis (methylene(3,5-di-tert-butyl)-4-hydroxy-hydrocinnamate) methane, phenothiazines, alkylamidonoisoureas, thiodiethylene bis(3,5-di-tert-butyl-4-hydroxy-hydrocinnamate, 1,2-bis(3,5-di-tert-butyl-4-hydroxyhydrocinnamoyl)hydrazine, tris(2-methyl-4-hydroxy-5-tert-butylphenyl)butane, cyclic neopentanetetrayl bis(octadecyl phosphite), 4,4'-thiobis(6-tert-butyl-m-cresol), 2,2'-methyl-enebis(6-tert-butyl-p-cresol), oxalyl bis(benzylidenehydrazide), and naturally occurring antioxidants such as raw seed oils, wheat germ oil, tocopherols, and gums, and mixtures thereof. Suitable nitroxides include, for example, 2,2,6, 6-tetramethyl-1-piperidinyloxy (TEMPO), 2,2,6,6-tetraethyl-1-piperidinyloxy, 2,2,6-trimethyl-6-ethyl-1-piperidinyloxy, 2,2,5,5-tetramethyl-1-pyrrolidinyloxy (PROXYL), dialkyl nitroxide radicals such as di-t-butyl nitroxide, diphenyl nitroxide, t-butyl-t-amyl nitroxide, 4,4-dimethyl-1-oxazolidinyloxy (DOXYL), 2,5-dimethyl-3,4-di carboxylic-pyrrole, 2,5-dimethyl-3,4-diethylester-pyrrole, 2,3,4,5-tetraphenyl-pyrrole, 3-cyano-pyrroline-3-carbamoyl-pyrroline, 3-carboxylic-pyrroline, 1,1,3,3-tetramethyl-isoindolin-2-yloxyl, 1,1,3,3-tetraethylisoindolin-2-yloxyl, porphyrexide nitroxyl radicals such as 5-cyclohexyl porphyrexide nitroxyl and 2,2,4,5,5-pentamethyl-D3-imidazoline-3-oxide-1-oxyl and the like, galvinoxyl and the like, 1,3,3A trimethyl-2-azabicyclo[2,2,2]octane-5-oxide-2-oxide, 1A azabicyclo[3,3,1]nonane-2-oxide, and the like. Substituted variants of these radical scavengers can also be used, such as 4-hydroxy-TEMPO, 4-carboxy-TEMPO, 4-benzoxyloxy-TEMPO, 4-methoxy-TEMPO, 4-carboxylic-4-amino-TEMPO, 4-chloro-TEMPO, 4-hydroxylimine-TEMPO, 4-oxo-TEMPO, 4-oxo-TEMPO-ethylene ketal, 4-amino-TEMPO, 3-carboxyl-PROXYL, 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3-maleimido-PROXYL, 3,4-di-t-butyl-PROXYL, 3'-carboxylic-PROXYL, 2-di-t-butyl-DOXYL, 5-decane-DOXYL, 2-cyclohexane-DOXYL, and the like.

Optionally, many commercial antioxidant stabilizers function by trapping free radicals and thus may be used as a radical scavenger. For example, IRGASTAB® UV 10 is a nitroxide and may suitably be used. Other suitable compounds may include, for example, NAUGARD® 524, NAUGARD® 635, NAUGARD® A. NAUGARD® 1-403, and NAUGARD® 959, commercially available from Crompton Corporation, Middlebury, Conn.; NAUGARD® 76. NAUGARD® 445, and NAUGARD® 512 commercially available by Uniroyal Chemical Company; IRGANOX® 1010 and IRGASTAB® UV 10, commercially available from Ciba Specialty Chemicals; GENORAD™ 16 and GENORAD™ 40 commercially available from Rahn A G, Zurich, Switzerland, and the like, as well as mixtures thereof.

The radical scavenger may be present in the composition in any effective amount. For example, it may be present in an amount of from about 0.01% to about 15% by weight of the composition, such as from about 0.05% to about 12% by weight of the optional third ink, from about 0.1% to about 10% by weight of the composition, or from about 1% to about 8% or about 2% to about 5% by weight of the composition.

In the molten state, where the composition is heated to above the melting point of the reverse polymer material, the composition is a very low viscosity liquid. For example, the liquid composition has a viscosity of from about 1 to about 100 cPs, such as from about 1 to about 50 cPs, from about 2 or from about 5 to about 10 or about 15 cPs at a temperature above the melting point of the reverse polymer material. For example, in one embodiment, and for use in an ink jet printing apparatus, it is desired that the liquid composition has a viscosity of from about 1 to about 100 cPs, such as from about 1 to about 50 cPs, from about 1 or from about 2 to about 30 or about 40 cPs, or from about 2 to about 20 cPs, at a temperature of from about 60 to about 140° C., such as from about 65 or from about 70 to about 125 or about 130° C., such as from about 75 to about 120° C. However, as the composition is cooled, cycloaddition takes place, resulting in a hard polymer with excellent film forming and adhesion characteristics.

Overprint Composition Application Methods

The overprint compositions of the present disclosure can be used in image processing, such as comprising generating an ink-based image on a substrate; ink jetting the overprint composition onto the printed image as a whole, or onto part(s) of the printed image; and allowing reverse polymerization to occur by cooling the overprint composition.

When the composition is coated onto the printed image or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimage areas of the substrate. The typical composition deposition level is in an amount of from about 5 to about 50 picolitres drop size. The composition can be applied in at least one pass over the image at any stage in the image formation using any known ink jet printing technique, such as, for example, drop-on-demand ink jet printing including, but not limited to, piezoelectric and acoustic ink jet printing. The application of the composition can be controlled with the same information used to form the image such that only one digital file is needed to produce the image and the overprint composition. Thus, the overprint composition is fully digital.

When coating an ink-based image, the ink-based image is generated first and then subjected to an ink jet printer containing the jettable overprint composition. If the ink-based image is formed using an ink jet printer, then the ink-based image can be subjected to a separate ink jet printer containing the jettable overprint composition or the ink jet ink can be housed in the same ink jet printer as the composition, whereby the composition is coated onto the substrate and/or image as a, for example, colorless, transparent fluid after the ink jet ink image is formed. When the overprint composition is coated over an ink-based image, such as an image produced using an ink jet printer, the image can be prepared by any suitable conventional process or variant thereof.

The substrate employed can be any appropriate substrate depending upon the end use of the print. Exemplary substrates include, but are not limited to, plain paper, coated paper, plastics, polymeric films, treated cellulosics, wood, xerographic substrates, and mixtures thereof, optionally comprising additives coated thereon. The optional additives include, but are not limited to, anti-curl compounds, such as, for example, trimethylolpropane; and mixtures thereof; and any other optional additives well known in the ink art or xerographic art for enhancing the performance and/or value of the ink and/or substrate.

Although the above discussion focuses on embodiments where the composition is applied using an ink jet apparatus, it will be apparent that other methods may also be used to apply the composition. For example, the composition may be applied to a substrate by spraying, coating, and the like.

Furthermore, although the above discussion focuses on embodiments where the printed image is an ink-based image, it will be apparent that other imaging methods can also be used. For example, the printed image can be applied by electrostatographic or electrophotographic imaging using toner materials, or by other known printing and imaging processes.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

General Procedure for Synthesis of Bismaleimides

In a 500 mL round-bottomed flask equipped with a magnetic stir bar was dissolved maleic anhydride (10.5 eq) in 75 mL DMF (dimethylformamide). The resulting solution was chilled on ice and the 1,8-octanediamine (5 eq) dissolved in DMF (75 mL) was added dropwise over ~20 min. The ice bath was removed, and sodium acetate (1 eq) and acetic anhydride (11 eq) were added in one portion, and the mixture stirred overnight at 50° C. The mixture turned dark brown within 30 minutes of the addition of NaOAc and Ac$_2$O. DMF was removed by vacuum distillation (60° C.), and DCM (dichloromethane) (150 mL) was added to the dark brown mixture. The organic layer was extracted with NaHCO$_3$ (5×100 mL), dried over MgSO$_4$, and the solvent removed under vacuum. The resulting compounds were purified by column chromatography.

1,1'-(octane-1,8-diyl)bis(1H-pyrrole-2,5-dione) (denoted M1): The general procedure was carried out using maleic anhydride (14.27 g, 146 mmol), 1,8-octanediamine (10.0 g, 69.3 mmol), sodium acetate (1.14 g, 13.9 mmol) and acetic anhydride (15.57 g, 153 mmol). The resulting compound was purified by column chromatography (98:2 DCM:EtOAc), and the product obtained as a white solid (5.2 g/25%).

1,1'-(cyclohexane-1,3-diyl)bis(methylene))bis(1H-pyrrole-2,5-dione) (denoted M2): The general procedure was carried out using maleic anhydride (20.59 g, 210 mmol), 1,3-cyclohexanebis(methylamine) (14.22 g, 100 mmol), sodium acetate (1.64 g, 20 mmol), and acetic anhydride (22.46 g, 220 mmol). The resulting compound was purified by column chromatography (98:2 DCM:EtOAc), and the product obtained as a white solid (3.55 g/12%).

1,1'-(1,3-phenylenebis(methylene))bis(1H-pyrrole-2,5-dione) (denoted M3): The general procedure was carried out using maleic anhydride (20.59 g, 210 mmol), m-xylylenediamine (13.62 g, 100 mmol), sodium acetate (1.64 g, 20 mmol), and acetic anhydride (22.46 g, 220 mmol). The resulting compound was purified by column chromatography (97:3 DCM:EtOAc), and the product obtained as a white solid (6.51 g/22%).

1,1'-((ethane-1,2-diylbis(oxy))bis(ethane-2,1-diyl)bis(1H-pyrrole-2,5-dione) (denoted M4): The general procedure was carried out using maleic anhydride (13.23 g, 135 mmol), 2,2'-(ethylenedioxy)bis(ethylamine) (10.0 g, 67.5 mmol), sodium acetate (1.11 g, 13.5 mmol), and acetic anhydride (15.15 g, 148 mmol). The resulting compound was purified by column chromatography (95:5 DCM:EtOAc), and the product obtained as a white solid (4.5 g/22%).

1,1',1''-(nitrilotris(ethane-2,1-diyl))tris(1H-pyrrole-2,5-dione) (denoted M5): In a 500 mL round-bottomed flask under argon was dissolved maleic anhydride (20.1 g, 205 eq) in 75 mL DMF. The resulting solution was chilled on ice and then tris(2-aminoethyl)amine (10.0 g, 68.4 mmol) dissolved in DMF (75 mL) was added dropwise over ~20 min. The ice bath was removed, and sodium acetate (1.68 g, 20.52 mmol) and acetic anhydride (23.04 g, 226 mmol) were added in one portion, and the mixture stirred overnight at 50° C. The mixture turned dark brown within 30 minutes of the addition of NaOAc and Ac$_2$O. DMF was removed by vacuum distillation (60° C.), and DCM (150 mL) was added to the dark brown mixture. The organic layer was extracted with NaHCO$_3$ (5×100 mL), dried over MgSO$_4$, and the solvent removed under vacuum. The resulting compound was purified by column chromatography (95:5 DCM:EtOAc), to yield a light yellow solid (8.0 g, 30%).

General Procedure for Synthesis of Bisfurans

To a 500 mL RBF (round bottom flask) equipped with a magnetic stir bar was added the 1,8-octanediamine (47.9 eq), triethylamine (95.7 eq), DMAP (4-Dimethylaminopyridine) (1 eq) and DCM (200 mL) The solution was chilled on ice, then furoyl chloride (100 eq) in DCM (50 mL) was added dropwise. The ice bath was removed, and the mixture stirred at room temperature overnight. The organic layer was extracted with NaHCO$_3$ (5×100 mL), dried over MgSO$_4$, and the solvent removed under vacuum. The resulting compounds were purified by column chromatography.

N,N'-(octane-1,8-diyl)bis(furan-2-carboxamide) (denoted F1): The general procedure was carried out using 1,8-octanediamine (10.0 g, 69.3 mmol), triethylamine (14.2 g, 141 mmol), DMAP (0.17 g, 1.35 mmol) and furoyl chloride (19.0 g, 146 mmol). The resulting compound was purified by column chromatography (98:2 DCM:EtOAc), and the product obtained as a white solid (21.5 g/92%).

N,N'-(cyclohexane-1,3-diylbis(methylene))bis(furan-2-carboxamide) (denoted F2): The general procedure was carried out using 1,3-cyclohexanebis(methylamine) (10.0 g, 70.3 mmol), triethylamine (14.2 g, 141 mmol), dimethylaminopyridine (0.17 g, 1.41 mmol), and furoyl chloride (19.0 g, 146 mmol). The resulting compound was purified by column chromatography (95:5 DCM:EtOAc), and the product obtained as a white solid (3.5 g/15%).

N,N'-(1,3-phenylenebis(methylene))bis(furan-2-carboxamide) (denoted F3): The general procedure was carried out using m-xylylenediamine (10.0 g, 73.4 mmol), triethylamine (14.9 g, 147 mmol), dimethylaminopyridine (0.17 g, 1.41 mmol), and furoyl chloride (20.13 g, 154 mmol). The resulting compound was purified by column chromatography (95:5 DCM:EtOAc), and the product obtained as a white solid (21.8 g/92%).

N,N'-((ethane-1,2-diylbis(oxy))bis(ethane-2,1-diyl))bis(furan-2-carboxamide) (denoted F4): The general procedure was carried out using 2,2'-(ethylenedioxy)bis(ethylamine) (10.0 g, 67.5 mmol), triethylamine (13.66 g, 135 mmol), dimethylaminopyridine (0.17 g, 1.41 mmol), and furoyl chloride (18.5 g, 142 mmol). The resulting compound was purified by column chromatography (95:5 DCM:EtOAc), and the product obtained as a white solid (10.9 g/48%).

N,N',N''-(nitrilotris(ethane-2,1-diyl))tris(furan-2-carboxamide) (denoted F5): In a 500 mL RBF under argon was added the 1,8-octanediamine (10.0 g, 68.4 mmol), triethylamine (20.76 g, 205 mmol), DMAP (0.68 g, 20.5 mmol) and DCM (350 mL). The solution was chilled on ice, then furoyl chloride (27.7 g, 212 mmol) in DCM (150 mL) was added dropwise. The ice bath was removed, and the mixture stirred at room temperature overnight. The organic layer was extracted with NaHCO$_3$ (5×100 mL), dried over MgSO$_4$, and the solvent removed under vacuum. The resulting compound was purified by column chromatography (99:1 DCM:EtOAc) to yield a white solid (16.1 g, 82%).

The bismaleimides M1 to M4 and bisfuran F1 to F4 prepared above are represented by the following structures were formed, where R the linking group R is varied as shown:

| Compound | R |
|---|---|
| M1, F1 | (heptamethylene chain) |
| M2, F2 | (cyclohexane-1,3-diyl) |
| M3, F3 | (benzene-1,3-diyl) |
| M4, F4 | (–CH$_2$CH$_2$OCH$_2$CH$_2$OCH$_2$CH$_2$–) |

The trigonal maleimide M5 and trigonal furan F5 are represented by the following structures:

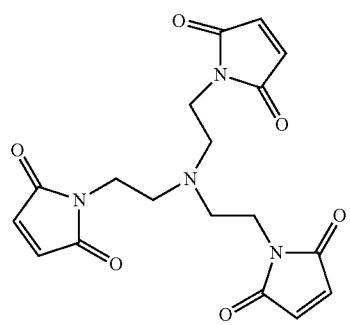

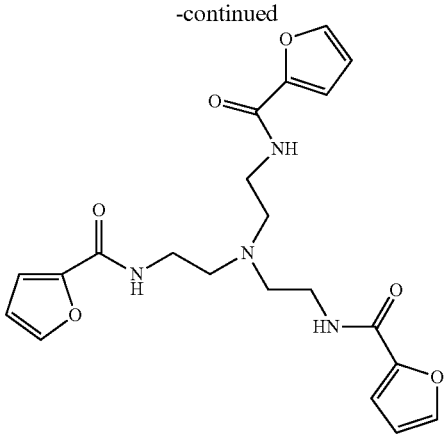

Example 1

A mixture of the pairs of maleimide and furan M1 and F1 was made by mixing the maleimide and the furan on about a 1:1 molar basis.

Examples 2-5

Similar to Example 1, mixtures of the pairs of maleimides and furans (M2 and F2, M3 and F3, M4 and F4, M5 and F5) were made by mixing the maleimide and the respective furan on about a 1:1 molar basis.

Analysis

Mixtures of the pairs of maleimides and furans of Examples 1-5 were made by mixing the maleimide and the respective furan on about a 1:1 molar basis. These samples were used for the following testing and analysis.

The testing showed that heating the solid maleimide/furan mixtures above their melting points resulted in very low viscosity liquids, while cooling of the mixtures resulted in Diels-Alder coupling, resulting in the formation of polymers. Heating the polymers above the melting point of the constituent maleimide/furan reverses the process, re-generating the low viscosity liquid. The reversibility of the process was verified by $^1$H NMR spectroscopy and DSC.

Figure 1B:
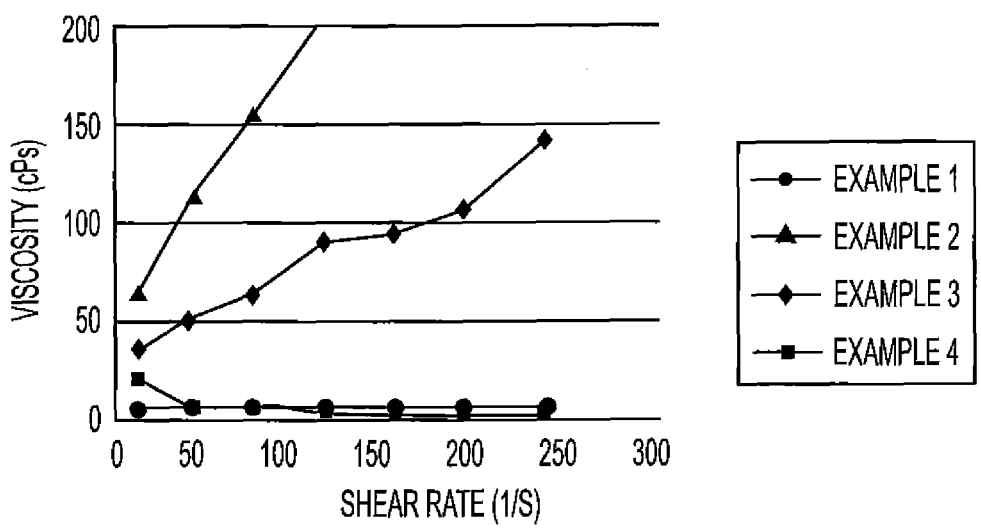

The mixtures were then heated to above their melting points to measure the viscosity behaviour of the mixtures. The mixture of Example 1 was heated to 120° C.; the mixture of Example 2 was heated to 190° C.; the mixture of Example 3 was heated to 150° C.; and the mixture of Example 4 was heated to 90° C. Viscosities were measured using an AR 2000 viscometer, available from TA Instruments. Measurements were made at 100 s$^{-1}$ for 25 minutes, using a 25 mm plate assembly, set at a gap width of 200 μm. The results are shown in FIGS. 1A and 1B, where FIG. 1B is a magnified scale of a portion of FIG. 1A. The dilatant behaviour of the mixtures of Examples 3 and 4 is believed to be due to the higher temperatures required for melting and viscosity measurement of these particular mixtures, which resulted in an irreversible cross-linking reaction.

Polymer films were cast using samples of the neat, molten monomers mixtures, and the polymer films were allowed to cool. Hardness and modulus were measured directly on these films using a Hysitron Triboindenter®. Samples were prepared by transferring the powder mixture (~50 mg) to a steel sample disc (15 mm diameter). The disc was placed on a hotplate that was pre-heated approximately 20° C. above the melting point of the mixture. Air bubbles that appeared during melting were removed by agitation of the liquid with a clean spatula. The sample discs were removed from the heat source and stored at 60° C., resulting in smooth films with relatively flat surfaces. Samples were allowed to equilibrate at room temperature for 1 h before measurements were made. A 10-2-10 load function was used (10 second load time, 2 second hold, and 10 second unload time) with a maximum load of 1000 μN. Measurements were made in 3×3 grids, with a spacing of 15 gm between each indentation. Three separate locations spaced at least 1 mm apart were used on each sample stub. Hardness and modulus values were determined by the Triboscan® software, and reported as an average of these 27 measurements. Control samples (PMMA, quartz) were measured before and after each set of measurements to ensure that measurements were within 5% of their expected values.

Figure 2A:
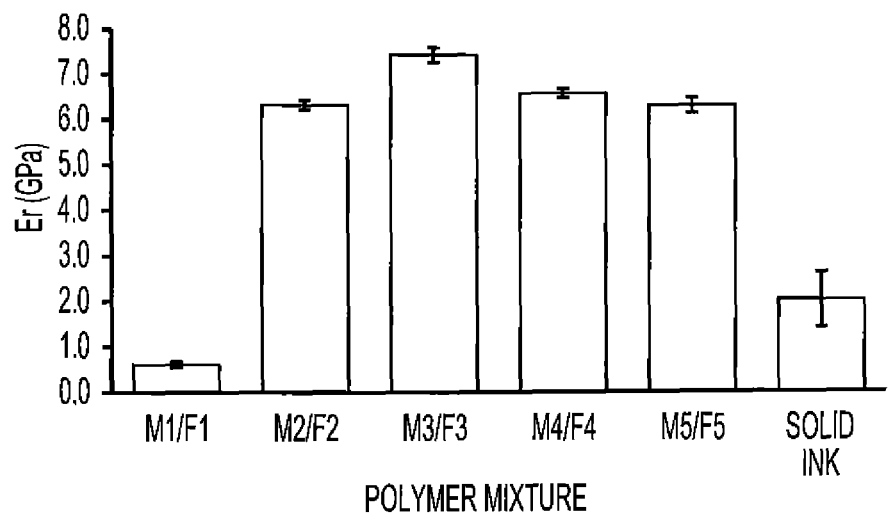
FIG. 2A and FIG. 2B show rheological data of coatings according to the Examples.
Figure 2B:
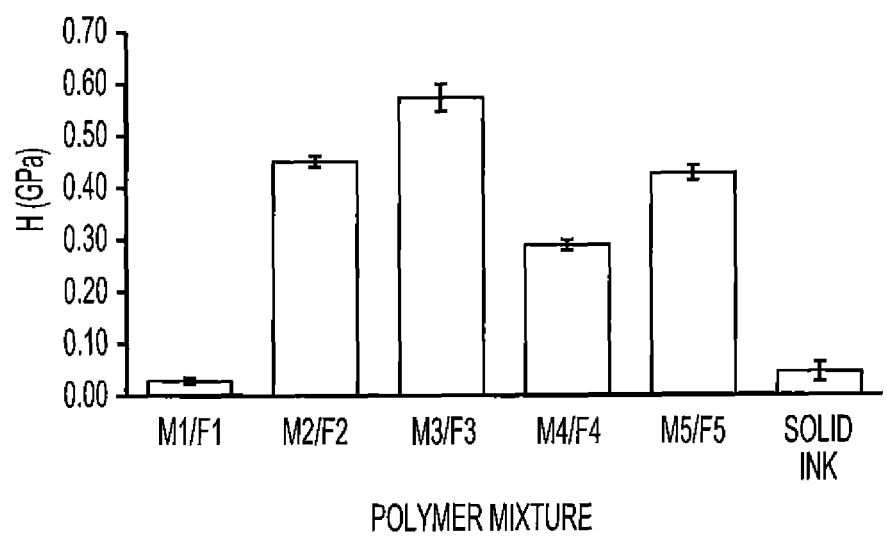

The results are shown in FIGS. 2A and 2B, where FIG. 2A shows the reduced modulus and FIG. 2B shows the hardness of the polymer films made from the mixtures. For comparison purposes, FIGS. 2A and 2B also include measurements for polymer films formed from an ink used in the Xerox COLORQUBE® printers and a polyester resin used to form toner particles for use in conventional copiers and printers such as the Xerox DC700 machine.

Figure 3:
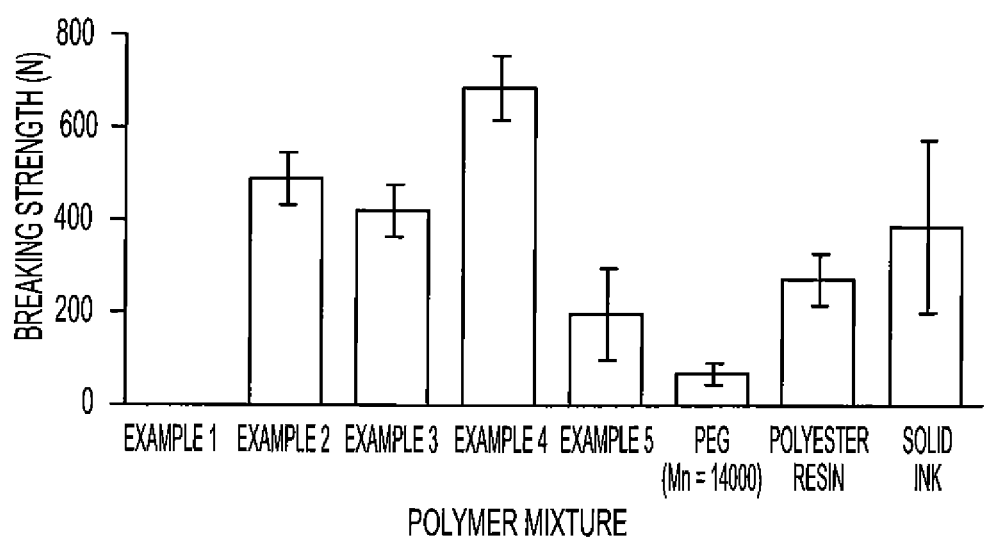
FIG. 3 shows the breaking strength of coatings according to the Examples.

Next, adhesion was measured using a method based on the American Society for Testing and Materials (ASTM) Method D2095 (1996), used for measuring the tensile strength of adhesives. According to this testing, a controlled amount of each mixture was melted between two pre-heated stainless steel dowels, and, after cooling, tested for tensile adhesive strength. The samples displayed excellent adhesive strength, with the mixture of Example 4 affording the best performance. For comparison, the mixtures of the Examples were tested against a commercial film forming polymer (polyethylene glycol, Mn=14000), as well as a Solid Ink used in the Xerox ColorQube® printers, and a polyester resin used to form toner particles for use in conventional copiers and printers such as the Xerox DC700 machine. The results are shown in FIG. 3.

Example 6

An image overcoat was prepared using the materials of Example 4. In this Example, first was prepared a K-Proof using the Xerox COLORQUBE® solid ink, and then another K-Proof was prepared using the monomers of Example 4. The K-Proof using the monomers of Example 4 was applied over the K-Proof using the Xerox COLORQUBE® solid ink. A separate K-Proof was made using only the Xerox COLORQUBE® solid ink, for comparison. All K-Proofs were made on coated paper (Xerox Digital Color Elite Gloss, 120 gsm) and then tested for image robustness. The images were scratched using the a three-finger gouge system, and another K-proof folded along with a Xerox Business 4200 (75 gsm) facing page in a Duplo D-590 folder and evaluated for fold crease. Evaluation was made using a Site Index Reference (SIR) rating system using the Xerox COLORQUBE® solid ink as the reference image. Samples were rated on a scale from 1 to 5 for the defect being evaluated, with a rating of 1 representing an exceptional level, a rating of 2 representing a good level, a rating of 3 representing a marginal/acceptable level, a rating of 4 representing a poor level, and a rating of 5 being completely unacceptable. The results were as follows:

| | Scratch | Fold Crease | Fold Offset | Crock Rub on Cloth |
|---|---|---|---|---|
| Example 4 overcoat on top of Solid Ink | 4 | 2.5 | 3 | 2.5 |
| Solid Ink | 5 | 5 | 2.5 | 5 |

It will be appreciated that various of the above-disclosed and other features and functions, or alternatives thereof, can be combined into many other different systems or applications. Also, various presently unforeseen or unanticipated alternatives, modifications, variations or improvements therein can be subsequently made by those skilled in the art, and are also intended to be encompassed by the following claims.

What is claimed is:

1. A method of ink jet printing, comprising:
providing an ink jettable overprint composition comprising a reversible polymer material, which can reversibly transition between a liquid state and a solid state by reversible cycloaddition reactions;
ink jetting the overprint composition onto a substrate having an image thereon; and
cooling the overprint composition, whereby the reversible polymer material transitions from a liquid state to a solid state by reversible cycloaddition reactions within a time period of less than about 10 seconds.

2. The method of claim 1, wherein upon cooling, the reversible polymer material transitions from a liquid state to a solid state by reversible cycloaddition reactions within a time period of less than about 1 second.

3. The method of claim 1, wherein the liquid state comprises a maleimide compound and a furan compound.

4. The method of claim 3, wherein the maleimide compound is a bismaleimide and the furan compound is a bisfuran of the following structures:

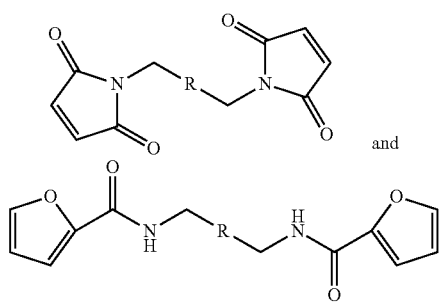

wherein each R, which can be the same or different, is a linking group.

5. The method of claim 4, wherein each R is selected from the group consisting of substituted or unsubstituted linear or branched alkyl groups, substituted or unsubstituted cyclic alkyl groups, substituted or unsubstituted aryl groups, substituted or unsubstituted arylalkyl groups, substituted or unsubstituted alkylaryl groups, and substituted or unsubstituted alkylenedioxy groups.

6. The method of claim 4, wherein each R is the same.

7. The method of claim 3, wherein the maleimide compound is a trigonal maleimide and the furan compound is a trigonal furan of the following structures:

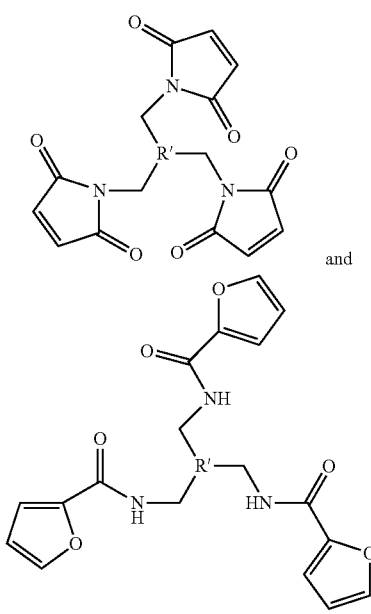

wherein each R', which can be the same or different, is a linking group.

8. The method of claim 7, wherein each R' is NR₃, and each R is selected from the group consisting of substituted or unsubstituted linear or branched alkyl groups, substituted or unsubstituted cyclic alkyl groups, substituted or unsubstituted aryl groups, substituted or unsubstituted arylalkyl groups, substituted or unsubstituted alkylaryl groups, and substituted or unsubstituted alkylenedioxy groups.

9. The method of claim 7, wherein each R' is the same.

10. The method of claim 3, the liquid state comprises two or more different maleimide compounds and two or more different furan compounds.

11. The method of claim 1, wherein the ink jettable overprint composition consists essentially of the reversible polymer material.

12. The method of claim 1, wherein the ink jettable overprint composition consists essentially of the reversible polymer material and a radical scavenger as a stabilizer.

13. The method of claim 1, wherein the ink jettable overprint composition has a viscosity of from about 1 cp to about 100 cPs at a temperature of from about 60° C. to about 140° C.

14. The method of claim 1, wherein the image is an ink-based image.

15. The method of claim 1, wherein the image is a toner-based image.

16. The method of claim 1, wherein the overprint composition is jetted substantially only over imaged areas of the substrate.

17. The method of claim 1, wherein the overprint composition is jetted over an entire surface of said substrate and said image.

18. A method of ink jet printing, comprising:
providing a substrate having an image thereon;
applying an overprint composition onto at least the image, the overprint composition comprising a reversible polymer material, which can reversibly transition between a liquid state and a solid state by reversible cycloaddition reactions; and
cooling the overprint composition, whereby the reversible polymer material transitions from a liquid state to a solid state by reversible cycloaddition reactions within a time period of less than about 10 seconds.

19. The method of claim 18, wherein the providing a substrate having an image thereon comprises ink jetting the image onto the substrate, and the overprint composition is applied onto at least the image by ink jetting the overprint composition.

* * * * *